United States Patent
Wang et al.

(10) Patent No.: US 8,026,977 B2
(45) Date of Patent: Sep. 27, 2011

(54) SWITCHING MECHANISM FOR VIDEO CAMERA

(75) Inventors: Tai-Kuo Wang, Taipei (TW); Wen-Chi Wang, Taipei (TW); Julian Lin, Taipei (TW)

(73) Assignee: VTC Electronics Corporation, Taipei (TW)

( * ) Notice: Subject to any disclaimer, the term of this patent is extended or adjusted under 35 U.S.C. 154(b) by 321 days.

(21) Appl. No.: 12/499,268

(22) Filed: Jul. 8, 2009

(65) Prior Publication Data

US 2011/0007206 A1 Jan. 13, 2011

(51) Int. Cl.
*H04N 5/225* (2006.01)
*H04N 5/222* (2006.01)

(52) U.S. Cl. .................................. 348/373; 348/333.06

(58) Field of Classification Search ............. 348/333.06, 348/372–373
See application file for complete search history.

(56) References Cited

U.S. PATENT DOCUMENTS

| | | | | |
|---|---|---|---|---|
| 5,128,770 A * | 7/1992 | Inana et al. | ................. | 348/211.4 |
| 6,925,279 B2 * | 8/2005 | Kamoshita et al. | ........... | 399/303 |
| 7,165,841 B2 * | 1/2007 | Satoh et al. | ........................ | 353/7 |
| 7,356,284 B2 * | 4/2008 | Yamada et al. | ................ | 399/162 |
| 7,853,189 B2 * | 12/2010 | Kamoshita et al. | ........... | 399/302 |
| 2009/0309986 A1 * | 12/2009 | Mayer | ...................... | 348/208.99 |

\* cited by examiner

*Primary Examiner* — Hung Lam
(74) *Attorney, Agent, or Firm* — Roger H. Chu (57) ABSTRACT

A switching mechanism for a video camera includes: a control unit; a driving device connected with and controlled by the control unit; a first belt pulley connected with the driving device; a second belt pulley smaller than the first belt pulley in diameter; a belt looped around the first and second belt pulleys for power transmission, and including a first protuberance; a translation member provided with a second protuberance so that through a loose fitting connection between the two protuberances, the translation member is driven to move; and a positioning element having a positioning plane, at least two inclines, and at least two top surfaces, wherein the positioning plane and the at least two inclines are designed to contact the second protuberance of the translation member alternately so as to restrict and reposition the translation member.

10 Claims, 8 Drawing Sheets

SWITCHING MECHANISM FOR VIDEO CAMERA

BACKGROUND OF THE INVENTION

1. Technical Field

The present invention relates to switching mechanisms applicable to video cameras and, more particularly, to a structurally simplified, novel switching mechanism for a video camera, wherein the switching mechanism serves to smoothly and quietly switch filters of the video camera without using any complex control unit.

2. Description of Related Art

For a general video camera equipped with a CCD or CMOS element to maintain a satisfactory image-capturing state in daytime as well as at night, it is necessary to switch filters for diurnal and nocturnal use of the video camera respectively such that high image fidelity is achieved in the day, and clear pictures can be taken during nighttime. Therefore, filter-switching mechanisms, i.e., structures with a filter-switching function, are commonly provided in video cameras.

Filter-switching mechanisms can be controlled by several methods, and from the perspective of control, the existing filter-switching mechanisms may be sorted into the following two types.

The first type is the "closed-circuit control mechanisms", which are the most basic and popular automatic switching mechanisms. In such a mechanism, employed in either a mechanical device or an optical device, feedback sensors are provided at a starting point and a terminal point of the switching operation. The feedback sensors detect the positions of objects being switched and output electronic signals to a control chip so that the control chip actuates or stops a driving device (usually a motor) accordingly, thereby realizing the desired switching function. Although this approach is capable of monitoring the conditions of the objects being switched, as well as providing reliable control over the objects, it is nevertheless disadvantaged by high costs and bulky design.

The other type is known as the "open-circuit control mechanisms". In such a mechanism, an input unit provides a positive control function in a one-way manner so that a motor drives an object without detecting conditions thereof. This type of mechanisms are advantageously simple and economical because no complex controllers and feedback mechanisms are required. However, since there are no position sensing devices (e.g., switches and sensors) for determining the conditions of the driven object, once the object is blocked from moving but the driving device (e.g., a motor) is not timely stopped, components along the driving link, such as the motor or a transmission mechanism (most probably the motor), are likely to be damaged. Therefore, to protect the components, it is necessary to incorporate into the control mechanism a mechanism for making and breaking the connection between the driven object and the driving device. One of the most popular solutions is control by frictional constraint. While this friction-based solution is mechanically simple and economical, it has such inherent and unconquerable defects as blindness toward the conditions of the driven object and significant operational noise.

Thus, there is a need for a novel switching mechanism that is applicable to video cameras and capable of eliminating all the above problems.

SUMMARY OF THE INVENTION

In view of the aforementioned need, the inventor of the present invention meditates, from the perspective of design, on solutions to maximizing the advantages of the existing open-circuit control mechanisms and remedying their defects such as poor reliability and significant operational noise, so as to enhance the quality and competitiveness of products using such mechanisms. According to a concept of the present invention, a loose fitting connection between a protuberance of a belt and a restoring element of a translation member is established so that rotation of the belt serves to move the translation member, thereby achieving an open-circuit control mechanism which not only operates with low noise and high reliability, but also is easily adaptable to various systems. To maximize spatial and economic advantages, the present invention proposes a mechanism for providing an automatic switching function without using feedback signals, so as to achieve "reciprocating motions" in a predetermined interval.

One objective of the present invention is to provide a switching mechanism for a video camera, wherein the switching mechanism uses a motor to drive a driven object through one-way control. The one-way control is simply achieved by inputting a voltage to the motor and allowing the motor to operate for a predetermined amount of time. The traditional open-circuit control mechanisms are simple and economical because no complex controllers and feedback mechanisms are required. However, these traditional mechanisms have defects, especially mechanical problems, to be overcome. In particular, since there are no position detecting devices (e.g., switches and sensors) for determining the position of the driven object, once the object is blocked but the driving device (e.g., a motor) is not timely stopped from driving the object, components along the driving link, such as the motor or a transmission mechanism (most probably the motor), are likely to be damaged. Therefore, the present invention proposes a novel open-circuit control mechanism based on the interaction between a belt and a translation member, wherein a second protuberance provided on the translation member is configured for timely breaking the connection between a motor and a driven object so as to control the status of the driven object.

Another objective of the present invention is to provide a switching mechanism for a video camera, wherein components of the switching mechanism are easy to design and apply. Beside, adjustment can be easily made by making and breaking the connection between the components of the switching mechanism so as to effectively prevent vibration, noise, and wear which may otherwise result from friction between the components.

A further objective of the present invention is to provide a switching mechanism for a video camera, wherein when a translation member arrives at a predetermined position, a loose fitting connection between a first protuberance of a belt and a second protuberance of the translation member is broken so that the translation member stops moving. Meanwhile, the second protuberance interacts with a positioning element so that the translation member is pushed back a small distance and thus remains in a range where the translation member is drivable.

The switching mechanism of the present invention includes: a control unit; a driving device connected with the control unit so as to be controlled thereby; a first belt pulley connected with the driving device; a second belt pulley smaller than the first belt pulley in diameter; a belt looped around the first belt pulley and the second belt pulley for power transmission, and including a first protuberance; a translation member provided with a second protuberance so that through a loose fitting connection between the second protuberance and the first protuberance of the belt, the translation member can be driven to move; and a positioning element having a positioning plane, at least two inclines, and at least two top surfaces, wherein the positioning plane and the at least two inclines are designed to contact the second protuberance of the translation member alternately so as to restrict and reposition the translation member. Thus, when the control unit actuates the driving device to rotate the first belt pulley, the second belt pulley and the belt are driven to run. At this time, since the first protuberance of the belt and the second protuberance of the translation member are in the loose fitting connection, the moving belt drives the translation member to translate. When the translation member moves to a predetermined position, the loose fitting connection between the first protuberance of the belt and the second protuberance of the translation member becomes broken, and thus the translation member stops moving. Then, the second protuberance interacts with a corresponding one of the at least two inclines of the positioning element so that the translation member is pushed back a small distance. As a result, the translation member is still positioned within a range where it is drivable.

BRIEF DESCRIPTION OF THE DRAWINGS

The invention as well as a preferred mode of use, further objectives, and advantages thereof will be best understood by reference to the following detailed description of illustrative embodiments when read in conjunction with the accompanying drawings, wherein:

FIG. 3A through FIG. 3F are top views showing operation of certain components of the first preferred embodiment shown in FIG. 2;

FIG. 4A through FIG. 4F are side views showing interaction between a translation member and a positioning element of the first preferred embodiment shown in FIG 2.

DETAILED DESCRIPTION OF THE PREFERRED EMBODIMENTS

Figure 1:
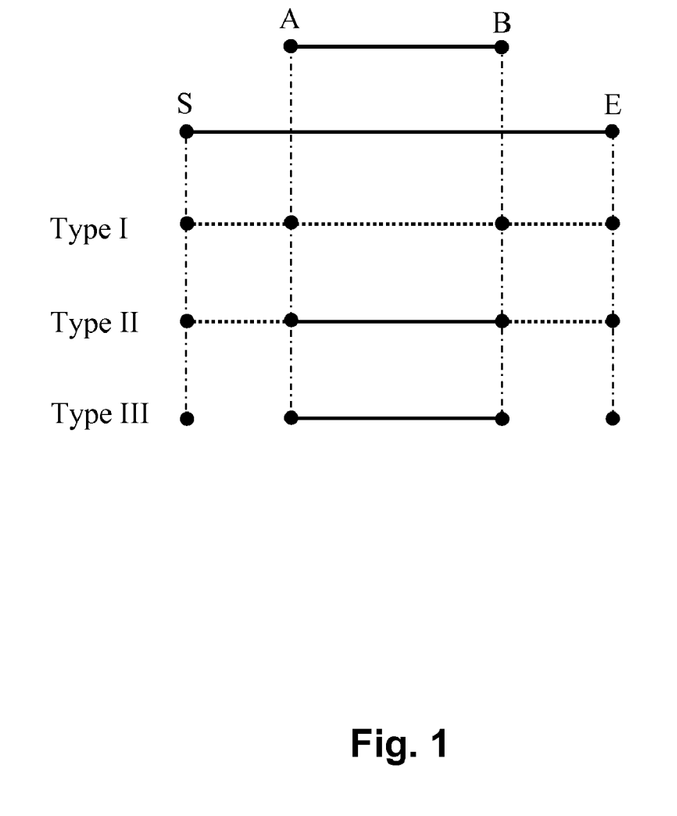
FIG. 1 graphically illustrates various principles for achieving reciprocating motions.

Before the present invention is described in detail, the basic principle employed therein is briefly stated. Please refer to FIG. 1 for various principles for achieving "reciprocating motions" within a predetermined interval between points A and B. A mechanism capable of such "reciprocating motions" can be utilized to convey an object back and forth or act as a switching mechanism. In FIG. 1, for expressing operation of a driving device (e.g., a motor), S denotes a starting point of energy input, and E represents a terminal point of the energy input. The entire motion process is controlled by the operation time of the driving device.

As shown in FIG. 1, there are three alternative principles applicable to designing a mechanism that performs reciprocating motions without using feedback control elements. The three principles are referred to as "Type I", "Type II", and "Type III" in the following description.

"Type I" refers to a connection between driven and driving units that is breakable at any time during the operational process, as indicated by the horizontal dotted lines in the drawing. In this type of connection, the driven unit will be retained at a specific position, such as points A and B in the drawing, whenever a constraining factor, based on either resilience or friction, is applied to the driven unit. However, since the "Type I" connection works upon an unstable kinematic relation between the driving and driven units, it suffers from unintentional detachment, frictional noise, and frictional wear, among other problems, so that the service life of the entire mechanism is significantly reduced.

The "Type II" connection is characterized in that, while the driven and driving units are constantly connected to each other over the entire operational process, the driven unit is completely constrained by the driving unit within a specific interval, as indicated by the horizontal solid lines in the drawing. Therefore, while the driven unit is moving in the interval between points A and B, it is under total control of the driving device so that a highly reliable motion control mechanism is achieved.

The "Type III" connection provides the most precise control among the three types. In the "Type III" connection, the driving unit is connected with the driven units only when the driven unit needs to be driven. By doing so, problems related to unstable connection are eliminated. The "Type III" connection incorporates the advantages of "Type I" and "Type II", and is thus adopted as the fundamental design principle of the present invention.

To achieve the intended objectives and functions of the present invention with the "Type III" connection, the inventor proposes a switching mechanism for a video camera wherein a first belt pulley, a second belt pulley, and a belt are used as the driving unit, and a translation member is used as a driven unit. In addition, a loose fitting connection is established between a first protuberance of the belt and a second protuberance of the translation member. Hereinafter, a first preferred embodiment and a second preferred embodiment are described for illustrating the spirit and implementation details of the present invention.

Figure 2:
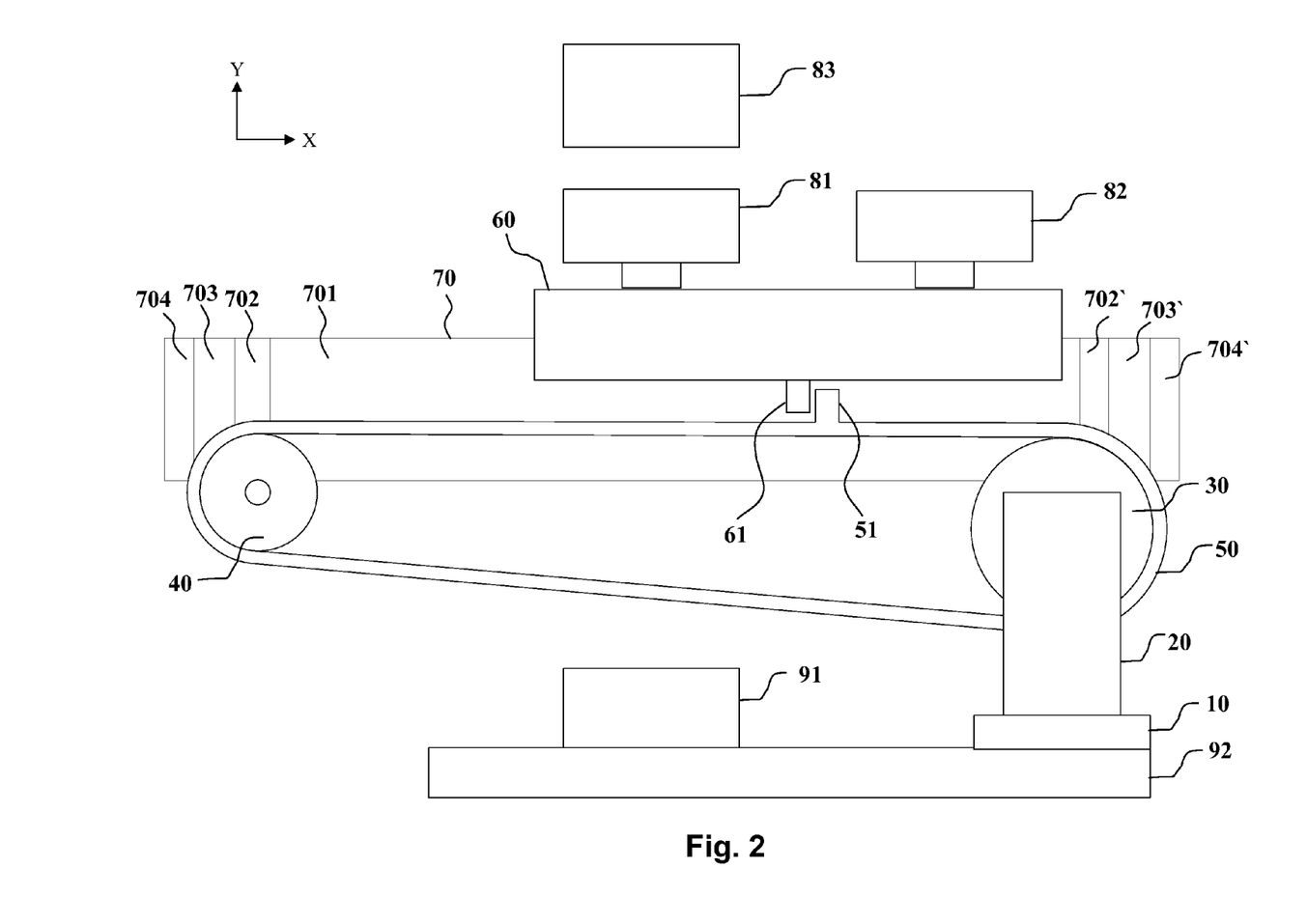
FIG. 2 is a schematic structural diagram showing a first preferred embodiment of the present invention.

FIG. 2 is a schematic structural diagram showing the first preferred embodiment of the present invention. According to the present embodiment, a switching mechanism for a video camera includes: a control unit 10; a driving device 20 which may be a motor and is connected with the control unit 10 so as to be controlled and actuated thereby; a first belt pulley 30 connected with the driving device 20; a second belt pulley 40 smaller than the first belt pulley 30 in diameter; a belt 50 which is looped around the first belt pulley 30 and the second belt pulley 40 for power transmission and includes a first protuberance 51; a translation member 60 provided with a second protuberance 61 so that through a loose fitting connection between the first protuberance 51 of the belt 50 and the second protuberance 61 of the translation member 60, the translation member 60 can be driven to move; and a positioning element 70 having a positioning plane 701, at least two recesses 702, 702', at least two inclines 703, 703', and at least two top surfaces 704, 704', wherein the positioning plane 701 and the at least two inclines 703, 703' are designed to contact the second protuberance 61 of the translation member 60 alternately so as to restrict and reposition the translation member 60. After the control unit 10 actuates the driving device 20 to rotate the first belt pulley 30, the driven first belt pulley 30 in turn drives the second belt pulley 40 and the belt 50 to run. At this time, the first protuberance 51 of the belt 50 and the second protuberance 61 of the translation member 60 are in the loose fitting connection, and in consequence the moving belt 50 drives the translation member 60 to translate. When the translation member 60 moves to a predetermined position, the loose fitting connection between the first protuberance 51 of the belt 50 and the second protuberance 61 of the translation member 60 is broken, and the translation member 60 stops moving as a result. Meanwhile, the second protuberance 61 interacts with the incline 703 or 703' of the positioning element 70 so that the translation member 60 is pushed back a small distance and thus remains within a range where the second protuberance 61 of the translation member 60 is drivable by the first protuberance 51 of the belt 50 again.

In the present embodiment, the translation member 60 is connected with a filter 81 and a glass plate 82. When the translation member 60 is driven by the first belt pulley 30, the second belt pulley 40, and the belt 50, the filter 81 and the glass plate 82 also displace so as to be adjusted to appropriate positions. In addition, a lens 83 is provided in front of the filter 81 or the glass plate 82 while an image capture device 91 and a PCB 92 are provided behind the filter 81 or the glass plate 82. The PCB 92 is connected with the image capture device 91 and the control unit 10. The image capture device 91 may be a CCD element or a CMOS element.

Figure 5A:
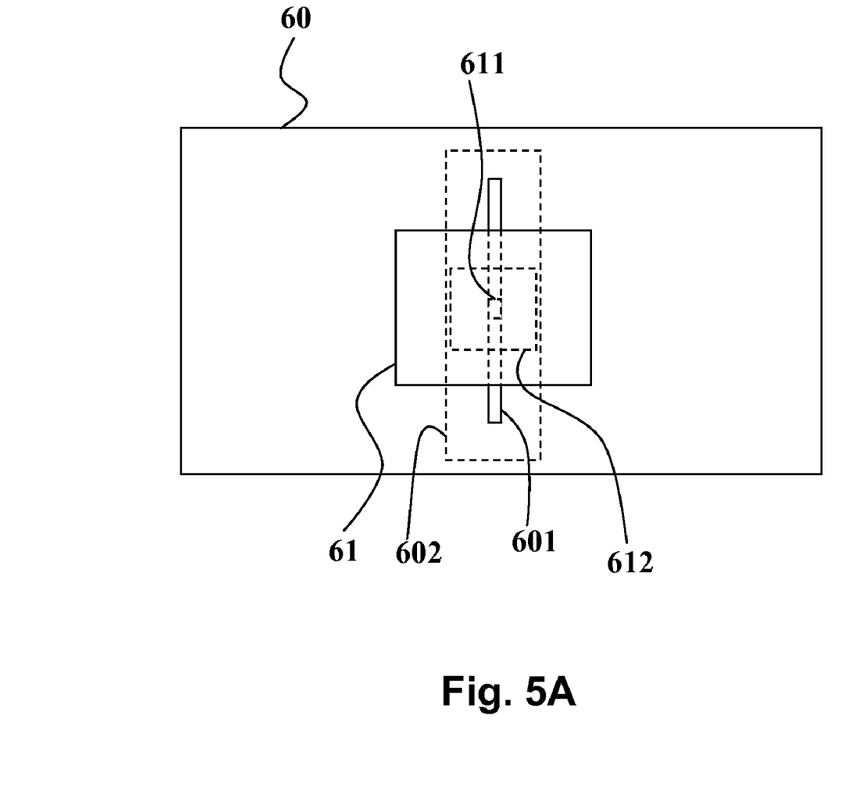
FIGS. 5A and 5B are schematic drawings showing detailed structure of, and connection between, the translation member and a second protuberance according to the first preferred embodiment of the present invention.
Figure 5B:
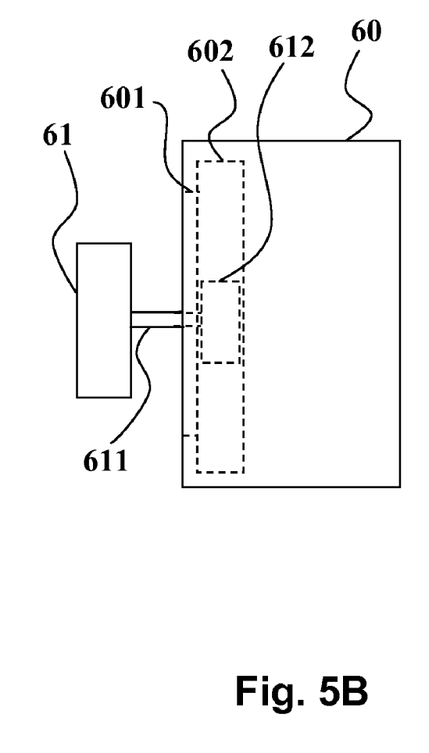

FIG. 5A and FIG. 5B are a front view and a side view of the translation member 60 and the second protuberance 61 according to the first preferred embodiment of the present invention. As shown in the drawings, the translation member 60 has a groove 601 extending perpendicular to translation directions of the translation member 60 and an inner accommodating recess 602. On the other hand, the second protuberance 61 is provided with a link 611 by which the second protuberance 61 is connected with a retaining block 612. The retaining block 612 is settled in the accommodating recess 602 of the translation member 60. The second protuberance 61 is allowed to move vertically when the link 611 moves in the groove 601.

Figure 3A:
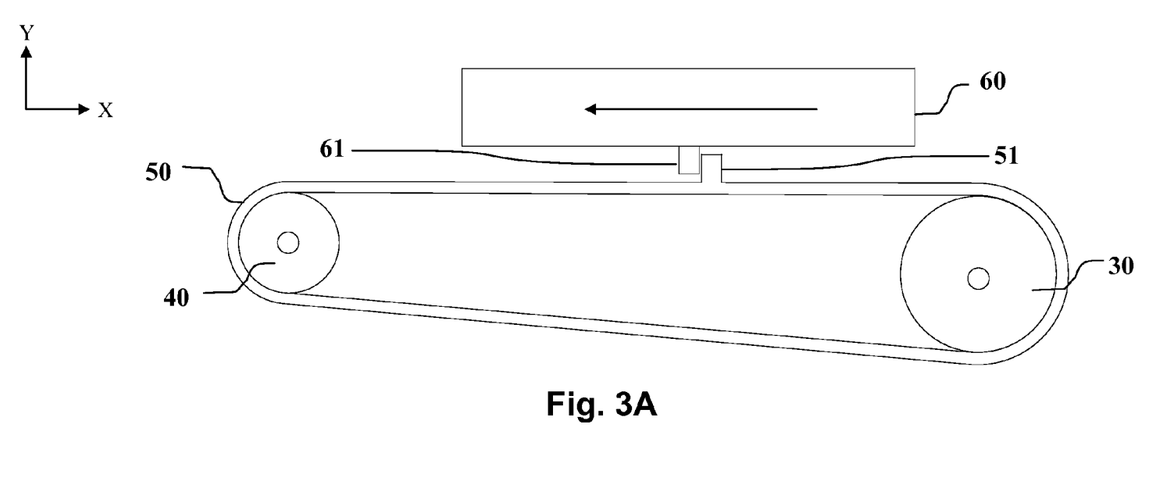
Figure 3B:
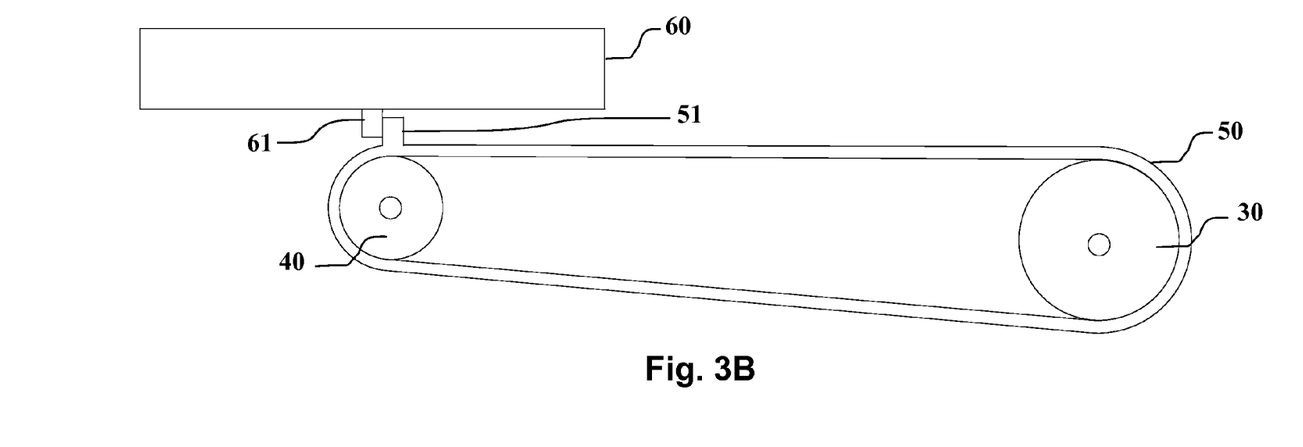
Figure 3C:
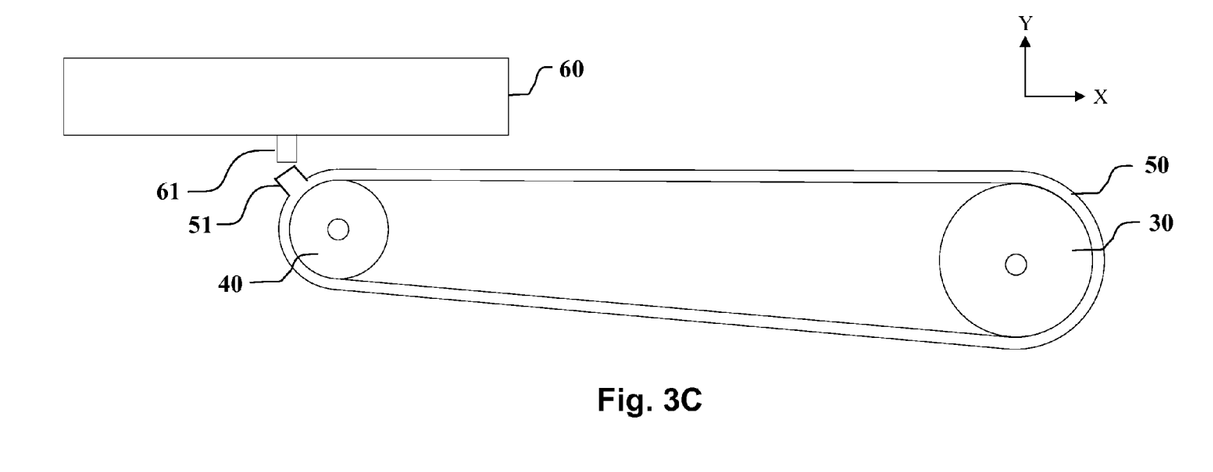
Figure 3D:
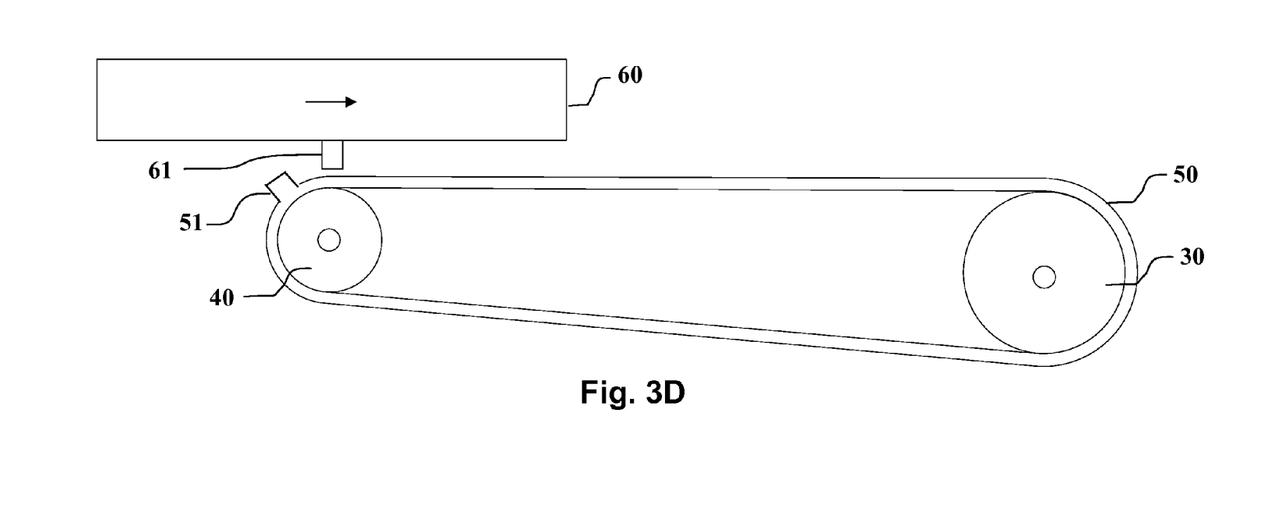
Figure 3E:
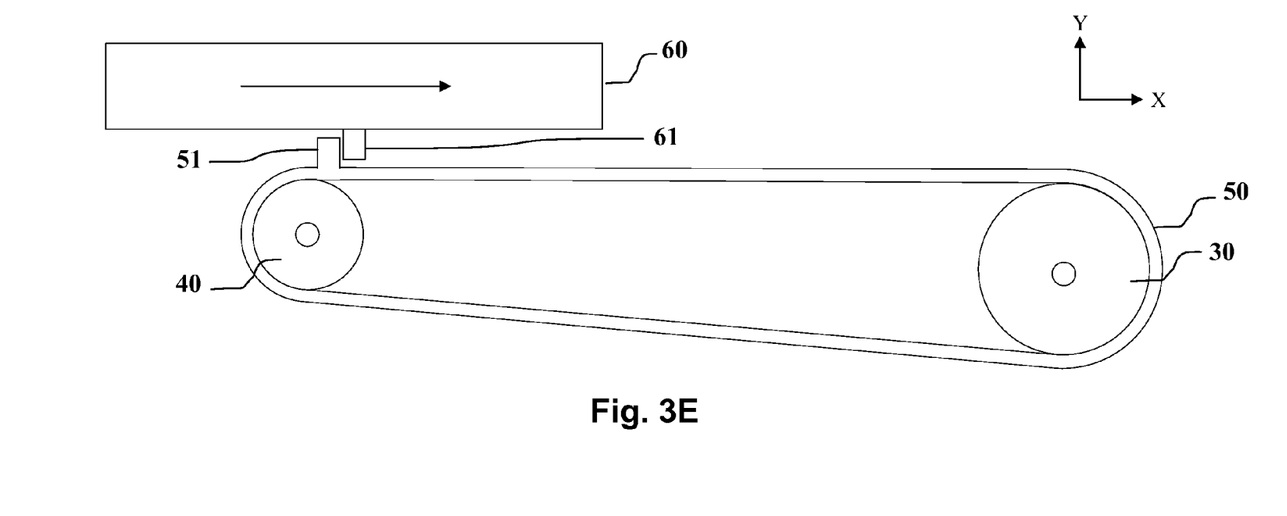
Figure 3F:
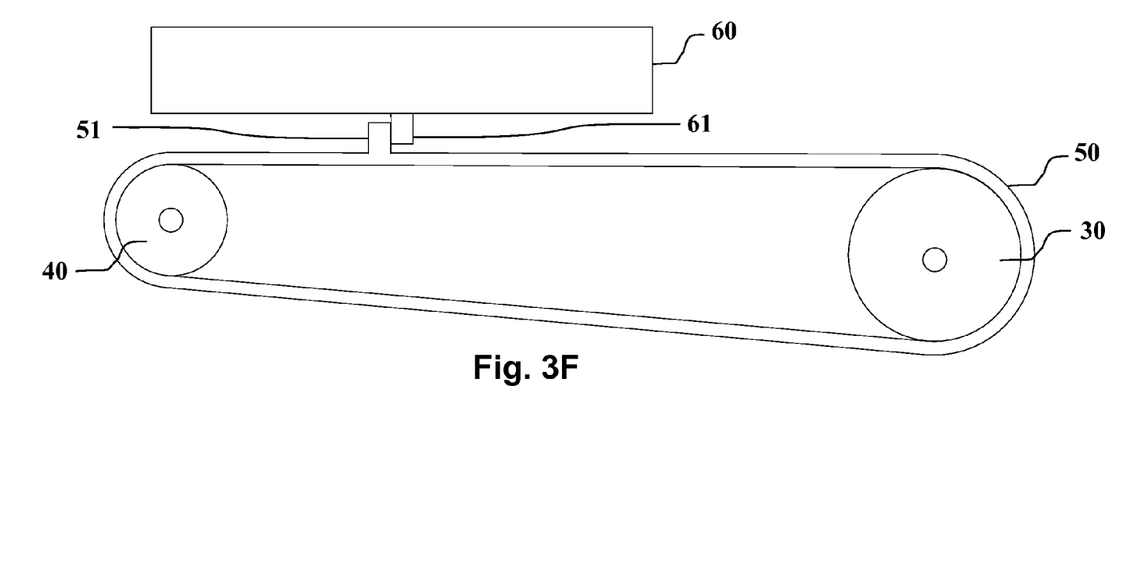
Figure 4A:
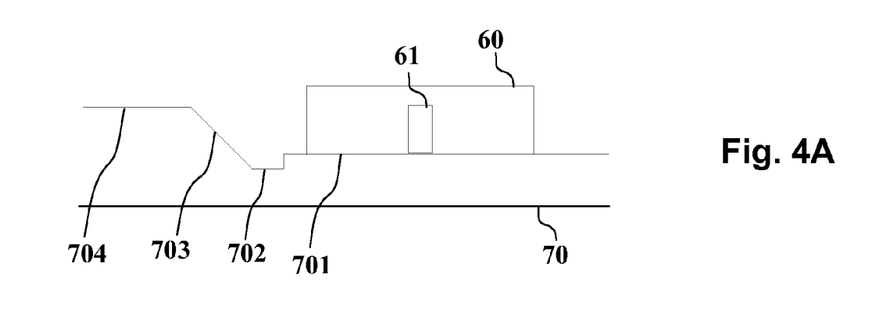
Figure 4B:
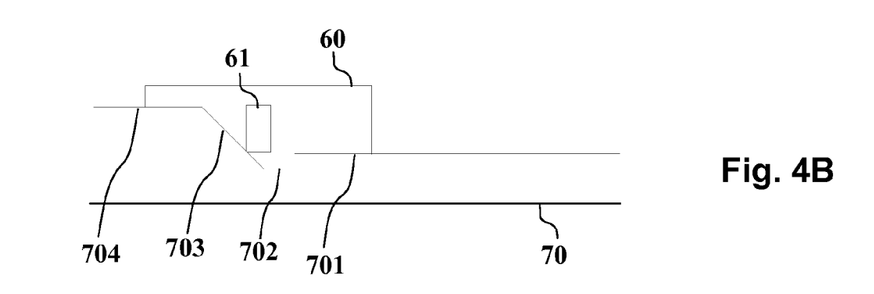
Figure 4C:
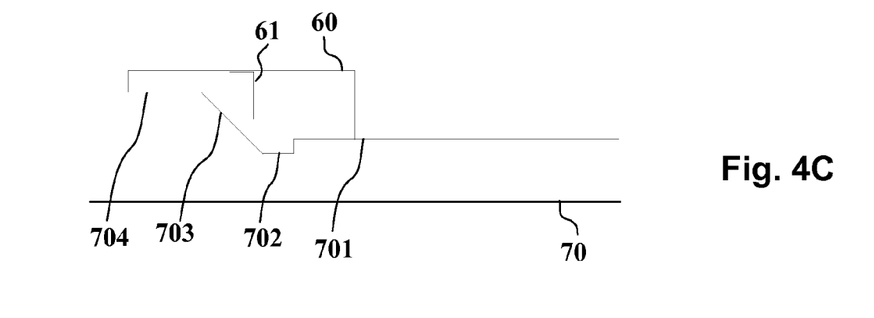
Figure 4D:
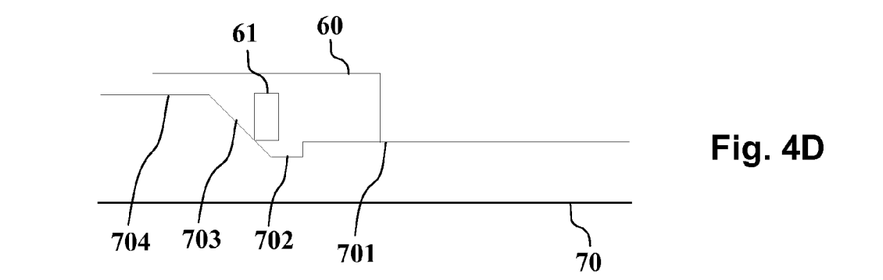
Figure 4E:
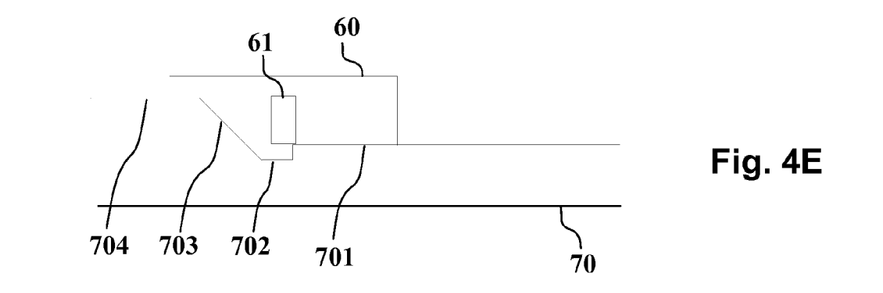
Figure 4F:
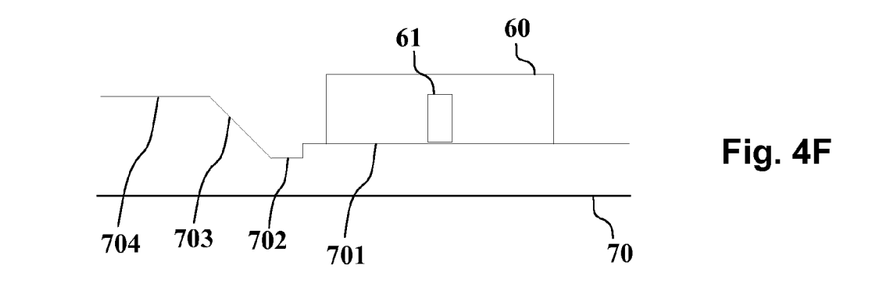

Please refer to FIGS. 3A through 3F and FIGS. 4A through 4F to see how the first belt pulley 30, the second belt pulley 40, and the belt 50 jointly drive the translation member 60 to displace and how the translation member 60 returns to a drivable position with the assistance of the positioning element 70 after the loose fitting connection is broken. FIGS. 3A through 3F are top views showing operation of certain components of the present invention while FIGS. 4A through 4F are side views showing interaction between the translation member 60 and the positioning element 70. Referring to FIG. 3A, rotation of the first belt pulley 30 and the second belt pulley 40 drives the belt 50 to rotate counterclockwise. At this time, the first protuberance 51 of the belt 50 and the second protuberance 61 of the translation member 60 are in the loose fitting connection, and the relative positions of the translation member 60 and positioning element 70 are shown in FIG. 4A. Then, when arriving at a predetermined position, the translation member 60 is about to disconnect from the belt 50, as shown in FIG. 3B, and the second protuberance 61 starts to contact the incline 703 of the positioning element 70, as shown in FIG. 4B. Afterward, referring to FIG. 3C, when the first protuberance 51 of the belt 50 pushes the second protuberance 61 to a left limit, the connection between the first protuberance 51 and the second protuberance 61 is about to break. When the second protuberance 61 contacts the incline 703 of the positioning element 70, the second protuberance 61 capable of vertical motion moves upward along the incline 703, as shown in FIG. 4C. After the second protuberance 61 is separated from the first protuberance 51 of the belt 50, the second protuberance 61 moves downward along the incline 703 of the positioning element 70 to return to its initial position, as shown in FIG. 4D. At this time, the translation member 60 moves a small distance to the right and thus returns to a position where it is drivable by the belt 50, as shown in the top view of FIG. 3D. Then, the first belt pulley 30, the second belt pulley 40, and the belt 50 can be rotated clockwise so that the first protuberance 51 of the belt 50 contacts the second protuberance 61 from the left, and in consequence a loose fitting connection therebetween is rebuilt, as shown in the top view of FIG. 3E and the side view of FIG. 4E. At last, with the rebuilt loose fitting connection between the first protuberance 51 of the belt 50 and the second protuberance 61, the belt 50 drives the translation member 60 to move to the right, as shown in the top view of FIG. 3F and the side view of FIG. 4F.

By the above operation, the translation member 60 is driven to reciprocate laterally so that the filter 81 and the glass plate 82 connected with the translation member 60 can be adjusted to appropriate locations. Besides, due to the interaction between the second protuberance 61 and the positioning element 70, the translation member 60 can be brought back to a drivable position after departing from the belt 50, so as to achieve repeatable operation of the switching mechanism.

It should be noted that the driving device 20, the first belt pulley 30, the second belt pulley 40, and the belt 50 are not coplanar with the other components as they may appear in the top view of FIG. 2. Besides, the position of the connecting point between the belt 50 and the translation member 60 is not limited in the present invention as long as light entering the image capture device 91 is not obstructed.

With the previously discussed structure, the filter 81 and the glass plate 82 can be smoothly switched with respect to the lens 83 and the image capture device 91. Therefore, not only is it possible for a general video camera using the switching mechanism of the present invention to use the filter 81 and the glass plate 82 according to the surrounding illumination, but also the problems related to excessive noise, operational resistance, and failure in restoration are eliminated. Furthermore, the subject matter of the present invention is simple in structure and easy to fabricate at a low production cost so that the maintenance cost is also lowered.

The second preferred embodiment of the present invention is identical to the first preferred embodiment in structure and operation except that the first belt pulley is smaller than the second belt pulley in diameter.

The present invention thus has the following advantages:
1. The present invention, which is based on the abovementioned "Type III" connection, uses components that are easy to design and apply.
2. The loose fitting connection between the components effectively prevents vibration, noise, and wear which may otherwise result from friction between the driving and driven units.
3. In practical applications, the linear route of the driven unit can be easily designed by setting the position at which a restoring element is to be released. Besides, when the driving unit goes in a reverse direction, the driven unit also goes in a reverse direction so as to realize an open-circuit mechanism that performs reciprocating motions.

The present invention is described herein by reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:
1. A switching mechanism for a video camera, the switching mechanism comprising:
   a driving device;
   a first belt pulley connected with the driving device;
   a second belt pulley;

a belt looped around the first belt pulley and the second belt pulley for power transmission, and including a first protuberance;

a translation member provided with a second protuberance, so that the translation member is driven by the belt to be moved through a loose fitting connection between the second protuberance and the first protuberance of the belt; and a positioning element having a positioning plane, at least two inclines, and at least two top surfaces, wherein the positioning plane and the at least two inclines are designed to contact the second protuberance of the translation member alternately so as to restrict and reposition the translation member;

wherein the driving device drives the first belt pulley to rotate and thereby drive the second belt pulley and the belt, due to the loose fitting connection between the first protuberance of the belt and the second protuberance of the translation member, so that the moving belt drives the translation member, the loose fitting connection between the first protuberance of the belt and the second protuberance of the translation member being broken and the translation member being stopped after the translation member moves to a predetermined position, then an interaction between the second protuberance and a corresponding one of the inclines of the positioning element bringing the translation member a small distance back and thereby positioning the translation member within a range where the translation member is drivable.

2. The switching mechanism of claim 1, wherein the translation member has a groove extending perpendicular to translation directions of the translation member and an inner accommodating recess, while the second protuberance is provided with a link by which the second protuberance is connected with a retaining block settled in the accommodating recess of the translation member, so that the second protuberance is allowed to move vertically when the link moves in the groove.

3. The switching mechanism of claim 1, wherein the translation member is connected with a filter and a glass plate so that when the translation member is driven by the first belt pulley, the second belt pulley, and the belt, the filter and the glass plate being moved simultaneously to appropriate positions.

4. The switching mechanism of claim 3, wherein a lens is provided in front of one of the filter and the glass plate while an image capture device and a PCB are provided behind one of the filter and the glass plate, the PCB being connected with the image capture device.

5. The switching mechanism of claim 4, wherein the image capture device is a CCD.

6. The switching mechanism of claim 4, wherein the image capture device is a CMOS.

7. The switching mechanism of claim 1, wherein the driving device is a motor.

8. The switching mechanism of claim 4 further comprising a control unit connected with the driving device and the PCB and configured for controlling the driving device.

9. The switching mechanism of claim 1, wherein the first belt pulley is greater than the second belt pulley in diameter.

10. The switching mechanism of claim 1, wherein the first belt pulley is smaller than the second belt pulley in diameter.

* * * * *